Oct. 1, 1968  J. W. GRATIAN  3,404,381

MECHANICAL BIASED FERROACOUSTIC MEMORY

Filed Aug. 31, 1964

INVENTOR.
JOSEPH W. GRATIAN
BY
ATTORNEY

# United States Patent Office 3,404,381
Patented Oct. 1, 1968

3,404,381
MECHANICAL BIASED FERROACOUSTIC MEMORY
Joseph W. Gratian, Rochester, N.Y., assignor to General Dynamics Corporation, a corporation of Delaware
Filed Aug. 31, 1964, Ser. No. 393,189
5 Claims. (Cl. 340—173)

ABSTRACT OF THE DISCLOSURE

A ferroacoustic memory system is disclosed wherein a line of magnetostrictive material (10) is provided for storing information at various locations therein by the coincident application of mechanical signals and electric field. The signals are propagated down the line by a transducer (34) and the field is applied by means of a conductor (12). The addressing for read-write is accomplished by electronic circuitry (44–45). The strain sensitivity of the line is enhanced by applying a mechanical bias. The use of a tension spring (32) for biasing is illustrated. Such biasing permits the use of a magnetically soft material for the line since it improves the strain sensitivity of such material.

---

This invention relates to information handling apparatus and particularly to a memory for storing digital data.

The invention is especially suitable for use in apparatus described in application for Letters Patent Ser. No. 701,479, filed by Joseph W. Gratian on Jan. 29, 1968, and assigned to the same assignee as this application.

The apparatus described in the Gratian application includes a line of magnetic material having the characteristic of changing its permeability in the presence of stress. The line is associated with means for its magnetization. Magnetostrictive material, for example, in the form of a tube may provide the line, and a conductor extending along the center of the tube may provide the magnetizing means. A transducer is coupled to the line for generating stress pulses which propagate along the line. To write, a stress pulse is propagated along the line. After a delay which determines the the point on the line reached by the stress pulse, a short current pulse is applied to the central conductor. Due to the coincident application of magnetic field and mechanical stress at the same point on the line, the remanence of the line is enhanced, and the line is magnetized at the specified point. The magnetized point may represent a stored data element such as a bit, and the location of the point is the address of that bit. To read, a stress pulse is again propagated along the line. After a delay, corresponding to the address of the bit, a gate coupled to the central conductor is enabled, momentarily. An electrical pulse representing the bit is induced in the conductor and read out through the gate. In other words, readout results from the movement of the stress pulse between line increments of different strain sensitivity respectively representing an unrecorded line portion and the recorded bit. By strain sensitivity is meant the change in induction or flux density which results from a change in stress in the line material. The memory apparatus described above is termed a "ferroacoustic" memory.

Hard or relatively difficult to magnetize magnetic materials have been used for ferroacoustic storage lines. These hard materials generally have low acoustic losses, i.e., low damping rates, and stress pulses are little attenuated as they propagate therealong, so that long storage lines can be attained. It has been found that hard materials also are stable over repeated readout. Hard materials are in the metallurgical class of hard-drawn metals, such as hard drawn nickel-iron and nickel-iron-chromium alloys.

A disadvantage of hard material lines is their low strain sensitivity and the high magnetic fields required for their magnetization. Accordingly large magnetizing currents and powerful transducers may be required.

It is an object of the present invention to provide improved information storage apparatus.

It is a further object of the invention to provide an improved ferroacoustic storage apparatus.

It is a still further object of the invention to provide an improved ferroacoustic storage apparatus in which information can more easily be written and which provides higher readout signal amplitude than previous apparatus of this type.

It has been found, in accordance with invention, that soft magnetic materials have much higher strain sensitivity than hard materials when such soft materials are subject to tension, in the case of some soft materials, and compression in the case of other soft magnetic materials. This tension or compression is in axial direction or, in the case of a ferroacoustic line, in the direction of propagation of the stress pulse. The increase in strain sensitivity is in the direction transverse to the applied tension or compression. The metallurgical class of annealed magnetic metals have the foregoing increased strain sensitivity. Among these magnetic metals are the following annealed magnetostrictive metals and metal alloys: 49% nickel–51% iron; 50% nickel–50% iron; 99.6% nickel; 4% cobalt–96% nickel; 99% nickel; 36% nickel–54.5% iron–7.5% chromium; and 70% nickel–30% iron. All of the above listed metals and alloys may for example be annealed by the following process: the materials are cold-drawn initially. An intermediate temper is obtained by annealing in dry hydrogen for one hour at 1400° F., and then cooling to room temperatures. To achieve a softer temper, the material is annealed in dry hydrogen for 4 hours at 2100° F., and then cooled to room temperature at a rate of less than 100° F. per hour.

Briefly described, a ferroacoustic memory embodying the invention includes a line of soft, magnetostrictive, magnetic material. Means are provided for initially establishing a strain on the line in a direction axially thereof. This strain may be compresison or tension depending on the type of soft material. For example compression is established in a line of annealed nickel whereas tension is established in a line of annealed 50% nickel–50% iron alloy or nickel-iron-chromium alloy. Means are provided for propagating stress pulses along the line. These pulses are polarized in a direction to counteract the tension or compression established in the line. Also, means are provided for applying a magnetic field to the line in timed relation to the propagated stress pulse for writing information in selected line increments. Means responsive to the change in induction when a propagated stress pulse passed a recorded line increment is provided for read-out of the information. Since the line is of soft material, it has the advantage of ease of magnetization on write-in. The high strain sensitivity provided for large signal output on readout.

The invention itself, both as to its organization and method of operation, as well as additional objects and advantages thereof will become more readily apparent from a reading of the following description in connection with the accompanying drawings in which.

Figure 1:
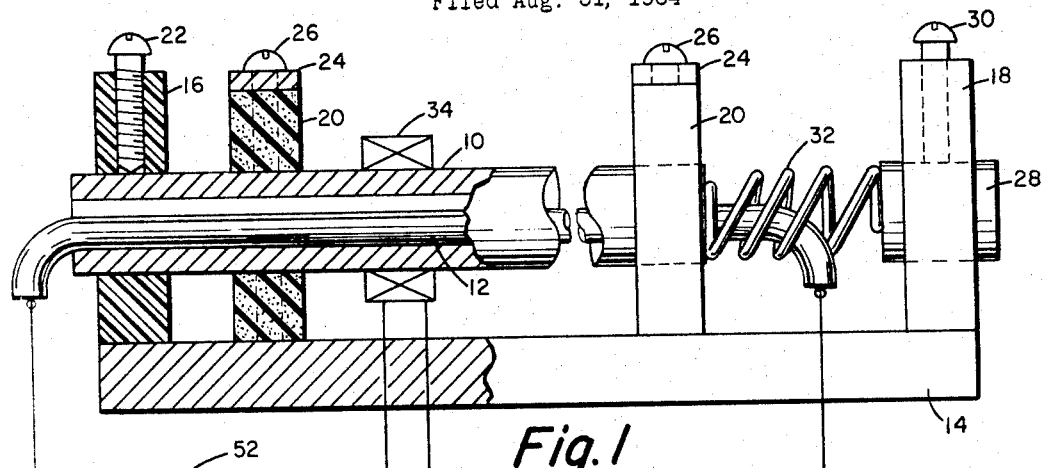
FIG. 1 is a diagrammatic view partially in block form, of information storage apparatus embodying the invention.

Referring more particularly to FIG. 1, there is shown a ferroacoustic memory system including an information storage line 10 of material, the permeability of which is a function of a stress which is applied thereto. The line 10 in the illustrated embodiment of the invention is a magnetostrictive magnetic metal or alloy, such as mentioned above. For purposes of explanation, it will be assumed that the material of the line 10 is a nickel-iron alloy containing approximately 50% nickel and 50% iron. A conductor 12 which functions as a current carrying and magnetic field producing element, is threaded along the longitudinal axis of the line 10. The line 10 is in the form of a tube which is supported on a base 14 by means of bars 16 and 18 and also by means of damping pads 20. The bars 16 and 18 may be of plastic material and the damping pads 20 may be of sound-absorbing material such as synthetic sponge rubber. A set screw 22, clamps one end of the line at the bar 16. The damping pads 20 may be held in place by cross pieces 24 which are held to the base by means of long screws or bolts 26. Additional supports, for example, in the form of U-shaped insulating members (not shown) disposed between the base and the tubular line 10, may also be used, particularly if the line 10 is long. It will be appreciated that the view is enlarged for clarity of presentation. The line may be two or three feet long. However, the tubing for the line may be 0.015 inch in diameter and 0.002 inch in wall thickness. The conductor 12 may have an insulating coating; and may, for example, be a length of enameled wire.

A rod 28 is fixedly held in the bar 18 by means of a set screw 30. The set screw 30 also permits rotational and axial movement of the bar 28 for adjusting purposes. A tension spring 32 is connected between the opposed ends of the line 10 and the bar 28. This tension spring tends to pull the opposed ends of the bar 28 and line 10 toward each other. Since the opposite end of the line 10 is held by the screw 22, the spring 32 tensions the line 10. The amount of tension may be adjusted by adjusting the position of the bar 28 by means of the set screw 30. Since the line 10 may have a small cross-sectional area, the spring 32 need only apply a small tensioning force to impose a large amount of tension, say a few hundred or even a thousand pounds per square inch.

For purposes of propagating stress pulses along the line 10, a coil 34 is wound around the line near one end thereof. This coil may contain a few turns of wire. Since the coil is wound around a body of magnetostrictive material (i.e., a portion of the line 10), the coil and line define a magnetostrictive transducer.

The system of circuits associated with the line, may include a pulse generator 44 which provides pulses at intervals which may be slightly greater than the time required (propagation time) for a mechanical pulse to travel the length of the line 10. The output pulses from the generator 44 excite the transducer defined by the coil 34 and a mechanical pulse is propagated along the line 10 for each output pulse which is generated. The pulses are applied to a variable delay circuit 46, which may be of various types known in the art, such as a monostable multivibrator which provides an output pulse, the leading or lagging edge of which may be shifted in time.

The output pulse from the generator 44, after a delay in the circuit 46, is applied to read-write logic which includes a read gate 50 and a write gate 52. The read-write logic also includes a switch 54 which connects the conductor 12 to an input of the read gate 50 or an output of the write gate 52. The read and write gates may be AND gates.

A control unit 56, operated by the instruction portion of the data to be written or to be read out of the line, is connected to the circuit 46 for adjusting the delay, provided by that circuit in correspondence with an address for the data in the line. For example, the control unit 56 may be a digital to analog converter which converts the instruction code representing the address to a voltage which varies the delay in the circuit 46. This delay may correspond to the time of propagation of the mechanical pulse to a point on the line 10 corresponding to the address of the data. The read gate 50 or the write gate 52 are then enabled so that a data line may be connected to the conductor 12. When the switch 54 is in the read position, the data line is connected to the conductor coincident with the arrival of the mechanical pulse at the address for the data.

Similarly, the data line is connected through the write gate 52 to the conductor 12 so that the signals representing the data may be stored at the proper address in the line 10. It should be understood that by address is meant that increment along the line 10 which provides storage for a particular item of data. This item may be a binary "1" or a binary "0," which respectively may be represented by a recorded or magnetized line increment and by unrecorded or unmagnetized line increment.

Figure 2:
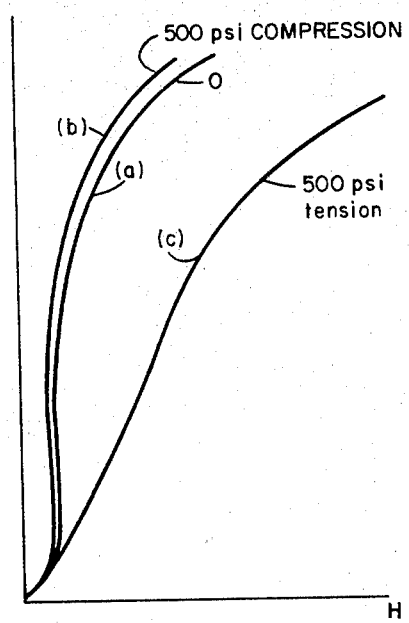
FIG. 2 is a series of curves illustrating the magnetization characteristics of the storage line of the apparatus shown in FIG. 1.

Since the line 10 is under tension, it has a much higher strain sensitivity than would otherwise be the case. FIG. 2 illustrates the magnetization characteristics in three situations: (a) when the line is not tensioned, (b) when the line is under 500 p.s.i. of compression, and (c) when the line is under 500 p.s.i. of tension. The latter case is illustrated in FIG. 1. For the same absolute magnitude of strain, i.e., 500 p.s.i., the change of induction in the line is relatively small for a compressive strain whereas the change in induction is relatively high for a strain in the opposite sense, namely, a tensive strain. Accordingly, in operation the line 10 is normally biased and maintained in tension. When a current pulse is applied to the transducer 34, a compressive stress pulse is produced which propagates down the line. This compressive stress pulse counteracts the static line tension and reduces the strain on the line, in successive increments thereof, to approximately zero strain, or a compressive strain may be produced. The change in induction in the line is, therefore, considerably greater than would be the case for an unbiased line, or for a line that was normally held in compression.

Figure 3:
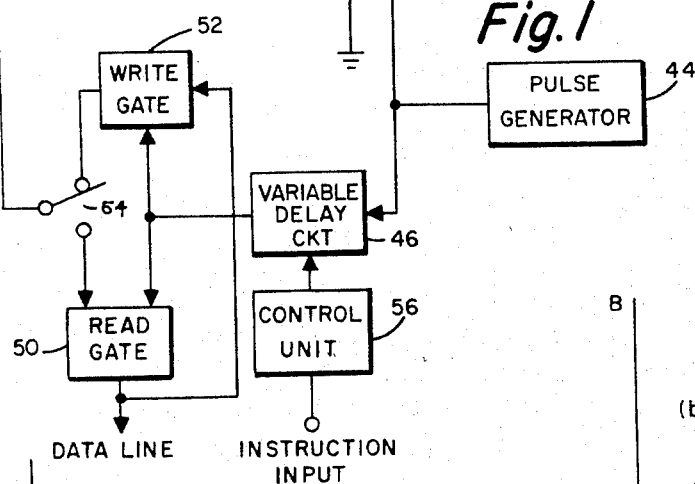
FIG. 3 is a series of curves showing the characteristics of the storage line during writing and reading.
Figure 3:
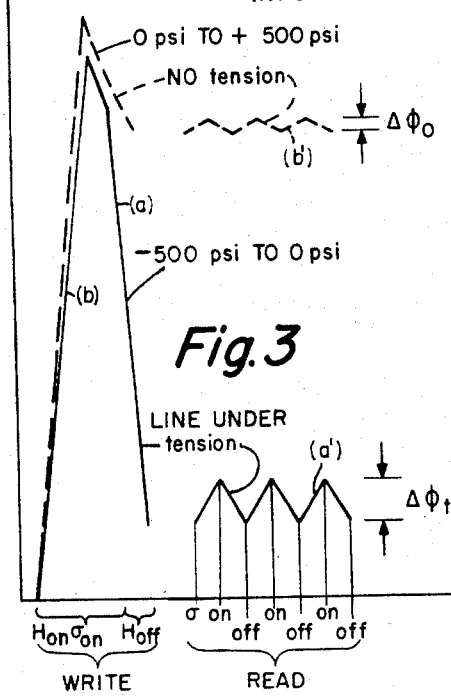

FIG. 3 illustrates the improvement provided in accordance with the invention. Curves (a) and (b), respectively, illustrate the magnetization characteristics of a line increment which is recorded by the use of combined stress and magnetizing field. Curve (a) represents the case where the line is normally held in tension, whereas curve (b) represents a case where the line is untensioned. In both cases, a compression stress pulse is propagated through the increment to be recorded. A magnetizing field H of the same magnitude, in both cases, is applied to the conductor 12 for purposes of recording or writing on the line. Since the compression pulse applied to the untensioned line increases the induction of the line somewhat more than a compression pulse applied to the tensioned line, the maximum induction attained by the increment of the line is higher in the case of the untensioned line.

The remanent induction of the untensioned line, after the termination of the stress pulse and the field, is also higher than is the case with the tensioned line, since the tensioned line is somewhat softer magnetically. However, the effective remanent induction is higher in the case of the tensioned line in that the tensioned line produces a much greater change of induction than an untensioned line upon readout. This change in induction in readout in the case of a tensioned line, is illustrated in curve (a'). The change of induction upon readout for the untensioned line is illustrated by the dashed line curve (b'). These curves are taken by propagating a series of compressive stress pulses along the line through the recorded increment thereof. It will be observed that the change in induction in the tensioned line is $\Delta\phi_T$, whereas the change of induction in the untensioned line is $\Delta\phi_0$. The change of induction for the tensioned line is several orders of magnitude higher than the change of induction for the untensioned line. Accordingly, the readout voltage due to recorded signals in a tension line, is much greater than the readout voltage in the case of the untensioned line.

Since the line is tensioned, the magnetization due to magnetizing field H, alone, in unrecorded line portions, is lower than the magnetization of the line would be if the line were not under tension. This difference in remanent induction follows from the fact that the tensioned line is effectively softer magnetically than the untensioned line. Accordingly, noise voltages due to line non-uniformities is lower than the case of the tensioned line and the readout voltage signal-to-noise ratio is higher.

From the foregoing description it will be apparent that there has been described improved information storage apparatus which is of the ferroacoustic type. While one embodiment of the invention has been described and illustrated, variations and modifications therein, within the scope of the invention will undoubtedly become apparent to those skilled in the art. Accordingly, the foregoing description should be taken merely as illustrative and not in any limiting sense.

What is claimed is:

1. A system for information storage comprising a medium of soft magnetic material having magnetostrictive properties, means for establishing a static strain on said medium in a sense to increase its strain sensitivity, means for applying a mechanical signal to said medium, said signal being a strain having a sense opposite to said static strain, and means for applying a magnetic field to said medium for obtaining coincident application of said mechanical signal and field to store information at selected locations along said medium.

2. Ferroacoustic information storage apparatus comprising a line of material selected from the class of annealed magnetostrictive metals and alloys including nickel, nickel-iron and nickel-iron-chromium, means for establishing a static strain on said line in a sense to increase its strain sensitivity, means for applying a mechanical signal to said medium, said signal being a strain having a sense opposite to said static strain, and means for applying a magnetic field to said line for obtaining coincident application of said mechanical signal and field to store information at selected locations along said medium.

3. Ferroacoustic information storage apparatus comprising a tube of magnetostrictive material characterized by being magnetically soft, a conductor centrally disposed in said tube along the axis thereof, spring means for applying a static mechanical bias to strain, said tube in one direction along the axis thereof, a coil around said tube for generating a stress pulse which propagates along said axis, the strain produced by said pulse and said bias being opposite to each other, and means for passing a current through said conductor in timed relation with said strain pulse to store information at selected locations along said tube.

4. Ferroacoustic information storage apparatus comprising a line of material selected from the class of annealed magnetostrictive alloys including nickel-iron and nickel-iron-chromium, means for applying static tensive bias to said line for increasing its strain sensitivity, means for applying a mechanical signal to said medium, said signal being a compression stress pulse, and means for applying a magnetic field to said line for obtaining coincident application of said mechanical signal and field to store information at selected locations along said medium.

5. Ferroacoustic information storage apparatus comprising a line of material selected from the class of annealed magnetostrictive metals including nickel, means for applying static compressive force to said line for increasing its strain sensitivity, means for applying a mechanical signal to said medium, said signal being a tension stress pulse, and means for applying a magnetic field to said line for obtaining coincident application of said mechanical signal and field to store information at selected locations along said medium.

References Cited

UNITED STATES PATENTS 3,217,301 11/1965 Shook _____ 340—174
3,320,596 5/1967 Smith _____ 340—174

TERRELL W. FEARS, *Primary Examiner.*